US008772633B2

(12) United States Patent
Behnken

(10) Patent No.: US 8,772,633 B2
(45) Date of Patent: Jul. 8, 2014

(54) METHOD AND SYSTEM FOR A CUTOUT COVER

(71) Applicant: Custom Coating Innovations, Inc., Lebanon, IL (US)

(72) Inventor: Joe Ralph Behnken, O'Fallon, IL (US)

(73) Assignee: Custom Coatings Innovations, Inc., Lebanon, IL (US)

( * ) Notice: Subject to any disclaimer, the term of this patent is extended or adjusted under 35 U.S.C. 154(b) by 167 days.

(21) Appl. No.: 13/649,209

(22) Filed: Oct. 11, 2012

(65) Prior Publication Data

US 2013/0087378 A1 Apr. 11, 2013

Related U.S. Application Data

(60) Provisional application No. 61/545,797, filed on Oct. 11, 2011.

(51) Int. Cl.
*H02B 1/06* (2006.01)
*H01B 19/00* (2006.01)

(52) U.S. Cl.
CPC .................................... *H01B 19/00* (2013.01)
USPC .................... 174/5 R; 174/138 R; 174/138 F; 174/139; 361/604; 29/887

(58) Field of Classification Search
USPC ................................ 361/604; 285/42; 29/887
See application file for complete search history.

(56) References Cited

U.S. PATENT DOCUMENTS

| | | | | |
|---|---|---|---|---|
| 6,211,768 | B1 | 4/2001 | Cress et al. | |
| 6,878,883 | B1 | 4/2005 | Rauckman | |
| 6,995,313 | B1 | 2/2006 | Barnett et al. | |
| 7,075,015 | B1 | 7/2006 | Rauckman | |
| 7,109,877 | B2 | 9/2006 | Cuk | |
| 7,154,034 | B2 | 12/2006 | Lynch | |
| 7,276,665 | B1 | 10/2007 | Rauckman | |
| 7,297,869 | B2 * | 11/2007 | Hiller et al. | 174/40 R |
| 7,309,837 | B1 | 12/2007 | Rauckman | |
| 7,361,841 | B1 * | 4/2008 | Smolen et al. | 174/138 F |
| 7,679,000 | B2 | 3/2010 | Rauckman | |
| 7,772,499 | B2 | 8/2010 | Rauckman | |
| 7,839,256 | B2 | 11/2010 | Bradford et al. | |
| 2008/0128163 | A1 | 6/2008 | Bradford et al. | |

OTHER PUBLICATIONS

International Search Report dated Jan. 7, 2013 for co-pending International Application No. PCT/US2012/059676 (8 pgs.).

* cited by examiner

*Primary Examiner* — Dhirubhai R Patel
(74) *Attorney, Agent, or Firm* — Armstrong Teasdale LLP

(57) ABSTRACT

A method and system for a cutout cover are provided. The cutout cover system includes a hollow head portion including a throat portion including an opening oriented toward a cutout when installed on the cutout and a tab portion extending from the hollow head portion in a first direction, the tab portion including a slit extending through the tab portion to the hollow head portion and dividing the tab portion into two joinable halves. The cutout cover also includes a nose portion extending from the hollow head portion in a second direction, the second direction opposite the first direction, the nose portion including a diverging cross-section along the nose portion from a distal end of the nose portion towards the head portion, the nose portion including a substantially smooth linear surface.

19 Claims, 7 Drawing Sheets

METHOD AND SYSTEM FOR A CUTOUT COVER

CROSS REFERENCE TO RELATED APPLICATIONS

This application claims the benefit of U.S. Provisional Patent Application No. 61/545,797 filed Oct. 11, 2011, which is hereby incorporated by reference in its entirety.

BACKGROUND OF THE INVENTION

Embodiments of the present invention relate to a cutout cover for polymer and porcelain cutouts covering an electrical utility mechanism to protect wildlife from electrocution. More particularly, the invention relates to a flexible, resilient and aerodynamic cover.

Cutouts used by electrical power suppliers in power distribution systems often contribute to power outages due to weather or animal intrusion onto the cutout. For example, small animals climbing across power lines from trees often encounter cutouts at the end of a power line. In disembarking from the power line at the cutout, the small animal can create a short to ground fault that is often detected by the protective equipment associated with the power distribution system. In some cases, the short clears and a recloser restores power to downstream components and loads. However, in other cases, the nature of the short prevents it from being cleared and the recloser times out and remains open, requiring the intervention of a line crew to clear the fault and restore power to the downstream components and loads.

Moreover, cutouts are subjected to the weather including icing conditions in the winter and wind throughout the year. At least some known cutout covers include various shapes that present flat surface faces to the wind permitting buffeting of the covered components. Such buffeting may affect the performance of the cutout cover, for example, a cutout cover may become dislodged from the cutout and/or moved from the installed position.

BRIEF DESCRIPTION OF THE INVENTION

In one embodiment, a cutout cover includes a hollow head portion including a throat portion including an opening oriented toward a cutout when installed on the cutout and a tab portion extending from the hollow head portion in a first direction, the tab portion including a slit extending through the tab portion to the hollow head portion and dividing the tab portion into two joinable halves. The cutout cover also includes a nose portion extending from the hollow head portion in a second direction, the second direction opposite the first direction, the nose portion including a diverging cross-section along the nose portion from a distal end of the nose portion towards the head portion, the nose portion including a substantially smooth linear surface.

In another embodiment, a method of forming a cutout cover includes forming a hollow head portion including a throat portion including an opening oriented toward a cutout when installed on the cutout, forming a tab portion extending from said hollow head portion in a first direction, said tab portion including a slit extending through said tab portion to said hollow head portion and dividing said tab portion into two joinable halves, and forming a nose portion extending from said hollow head portion in a second direction, the second direction opposite the first direction, said nose portion including a diverging cross-section along said nose portion from a distal end of said nose portion towards said head portion, said nose portion including a substantially smooth linear surface.

In still another embodiment, a method of using a cover for a cutout device includes spreading opposing portions of the cutout cover along a slit in a side of the cutout cover, positioning the cutout cover proximate an upper end of an insulator and an upper end of an adjacent fuse, and drawing the cutout cover down onto the upper end of the insulator and the upper end of the fuse.

BRIEF DESCRIPTION OF THE DRAWINGS

FIG. 1 is a side elevation view of a high voltage power distribution system in accordance with an exemplary embodiment of the present invention;

FIG. 2 is a side elevation view of the drop fuse cutout shown in FIG. 1 having a cutout cover installed in accordance with an exemplary embodiment of the present invention;

FIG. 3 is a side elevation view of the cutout cover shown in FIG. 2 in accordance with an exemplary embodiment of the present invention;

FIG. 4 is a plan view of the cutout cover in accordance with an exemplary embodiment of the present invention;

FIG. 5 is a front perspective view of the cutout cover in accordance with an exemplary embodiment of the present invention;

FIG. 6 is a cutaway view of the cutout cover in accordance with an exemplary embodiment of the present invention;

FIG. 7 is a bottom view of the cutout cover in accordance with an exemplary embodiment of the present invention; and FIG. 8 is a perspective cutaway view of the drop fuse cutout having the cutout cover installed in accordance with an exemplary embodiment of the present invention.

DETAILED DESCRIPTION OF THE INVENTION

The following detailed description illustrates embodiments of the invention by way of example and not by way of limitation. It is contemplated that the invention has general application to electrical and mechanical equipment in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
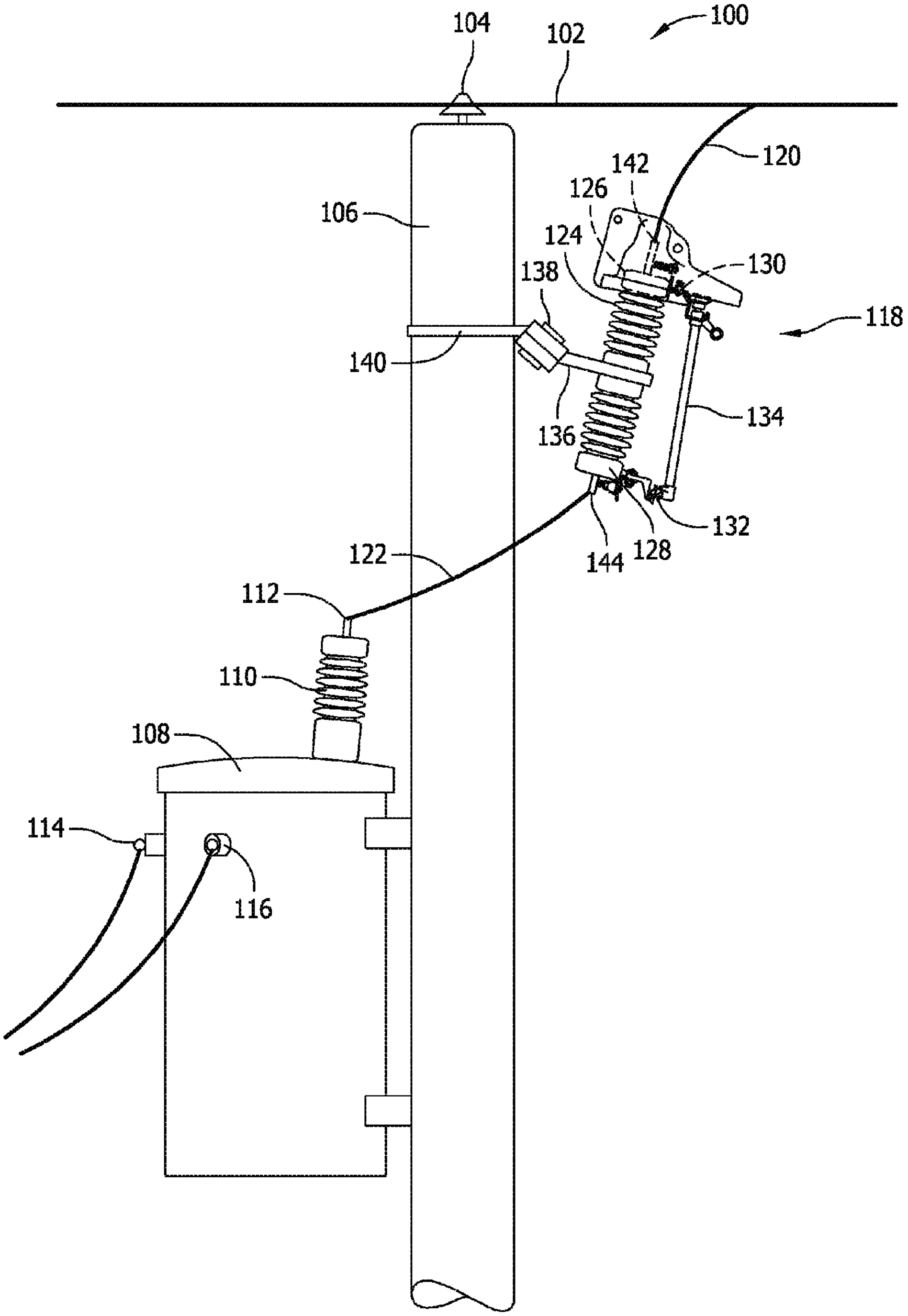
FIGS. 1-8 show exemplary embodiments of the method and apparatus described herein.

FIG. 1 is a side elevation view of a high voltage power distribution system 100 in accordance with an exemplary embodiment of the present invention. In the exemplary embodiment, system 100 includes a high voltage line 102 carrying current associated with a single phase of a three phase power distribution system. High voltage line 102 may carry a voltage of approximately 4 to 25 kV, for example. High voltage line 102 is supported by an insulator 104 secured to a conventional power pole 106. A single-phase transformer 108 including a primary terminal bushing 110 having a primary terminal 112 connected to a primary winding (not shown) of transformer 108 is mounted to the power pole 106. Transformer 108 also has secondary terminals 114 and 116, respectively, connected to a secondary winding (not shown) of the transformer.

A drop fuse cutout 118 is electrically coupled to high voltage line 102 through a first wire 120 and to primary terminal 112 through a second wire 122. In the exemplary embodiment, drop fuse cutout 118 is mechanically coupled and supported by power pole 106. In this embodiment, drop fuse cutout 118 includes a porcelain insulator 124 having first and second opposite ends 126 and 128, respectively, with first and second fuse contacts 130 and 132 being connected to the first and second opposite ends 126 and 128, respectively, for holding a fuse 134. Insulator 124 includes a bracket 136 connected thereto which is secured using a fastener 138 to a pole bracket 140, for securing drop fuse cutout 118 to power pole 106. Insulator 124 also has a first and a second line connectors 142 and 144 electrically connected to first and second fuse contacts 130 and 132, respectively. First wire 120 is connected between high voltage line 102 and first line connector 142 and second wire 122 is connected between second line connector 144 and primary terminal 112 of transformer 108. Thus, current drawn by the transformer 108 is drawn through first wire 120 to first line connector 142, through fuse contact 130, through fuse 134, through second fuse contact 132 to second line terminal 144 and through second wire 122 to primary terminal 112 on transformer 108.

Figure 2:
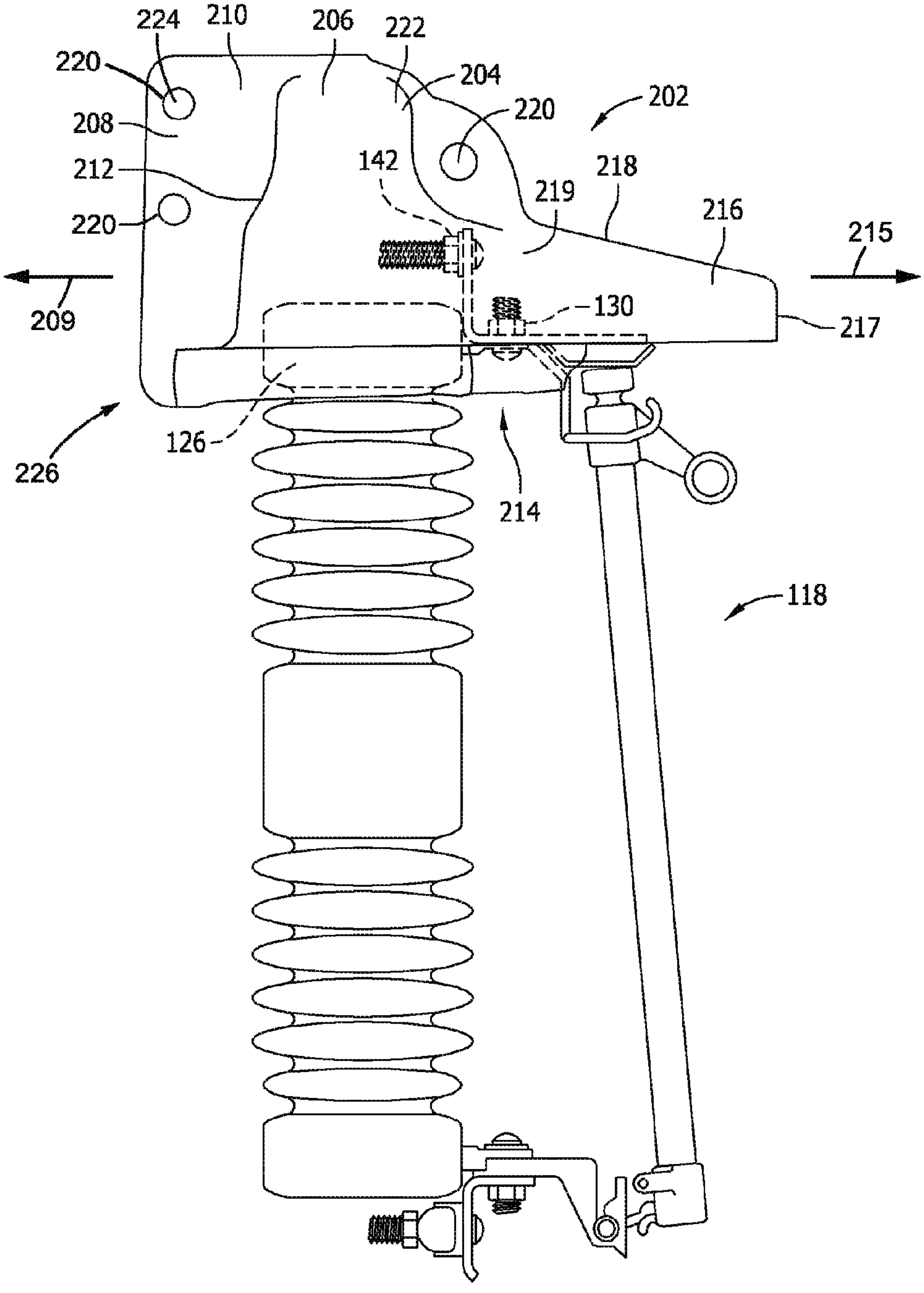

FIG. 2 is a side elevation view of drop fuse cutout 118 having a cutout cover 202 installed in accordance with an exemplary embodiment of the present invention. In the exemplary embodiment, cutout cover 202 is a unitarily-formed dielectric cover configured to isolate exposed electrical portions of drop fuse cutout 118 where wildlife or humans are most likely to contact.

Cutout cover 202 is formed of a flexible and resilient material configured to fit snugly around drop fuse cutout 118. Cutout cover 202 includes a hollow top portion 204 with a head portion 206 for covering first end 126 and tab portion 208 extending from head portion 206 in a first direction 209. A slit 210 extends through top portion 204 along a contour 212 of head portion 206 separating tab portion 208 into two joinable halves. Cutout cover 202 also includes a substantially open bottom end 214 that permits access to head portion 206 from external to cutout cover 202 and configured to receive first line connector 142 and first fuse contact 130.

Cutout cover 202 includes a wedge-shaped nose portion 216 extending from head portion 206 in a second direction 215, opposite first direction 209 and configured to be aerodynamically tapered to reduce wind forces impinging on cutout cover 202. Nose portion 216 includes a smooth protuberance-free surface 218 that tends to shed ice and reduce the possibility of buildup of ice along surface 218. Smooth surface 218 provides less of a foothold for wildlife and is therefore less likely to be used by wildlife than surfaces of other known cutout covers that include grippable protuberances, ridges, edges, and features that wildlife can use to facilitate climbing. Having a less attractive surface to wildlife tends to dissuade the use of cutout cover 202 by wildlife. Nose portion 216 is tapered divergently from a distal end 217 to an end 219 of nose portion 216 proximate a middle of cutout cover 202.

Cutout cover 202 also includes features that enhance installation and securing cutout cover 202 in place on drop fuse cutout 118. An eyelet 220 configured to receive a tool, such as, but not limited to, a lineman's hotstick or remote operator (not shown). Additionally, slit 210 permits cutout cover 202 to be spread apart using a live hinge portion 222 during installation. The resilient material is manipulable with a tendency to spring back to an original shape of cutout cover 202. Once installed on drop fuse cutout 118, cutout cover 202 is fastenable to drop fuse cutout 118 using one or more fasteners 224 that join the two halves of hollow top portion 204 across slit 212. When fastened, head portion 206 engages first end 126 in an interference fit to secure cutout cover 202 to drop fuse cutout 118. Cutout cover 202 includes an extended throat 226 extending away from head portion 206.

Figure 3:
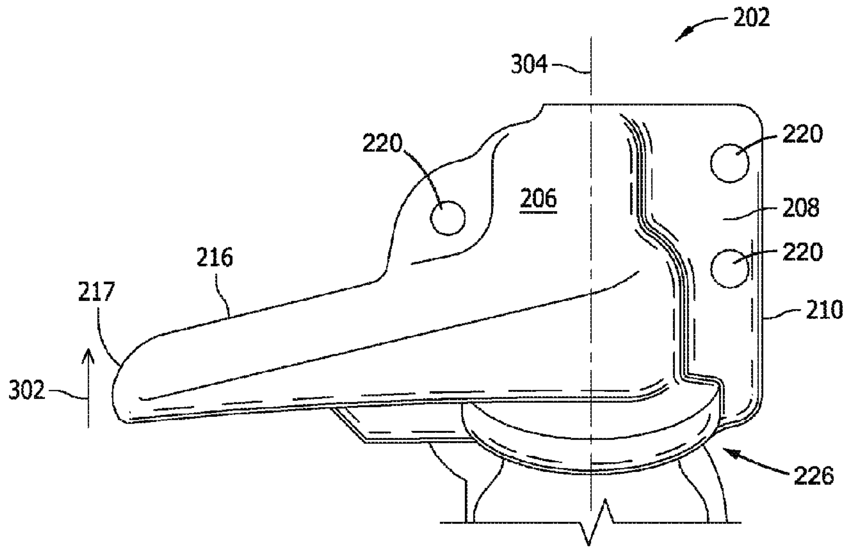

FIG. 3 is a side elevation view of cutout cover 202 in accordance with an exemplary embodiment of the present invention. In the exemplary embodiment, cutout cover 202 includes wedge-shaped nose portion 216 configured to present an aerodynamic profile and ice shedding feature based on a taper of wedge-shaped nose portion 216 from head portion 206 to distal end 217. Wedge-shaped nose portion 216 is tapered is a vertical direction 302, which is parallel to a central axis 304 of insulator 124 (shown in FIG. 1).

Figure 4:
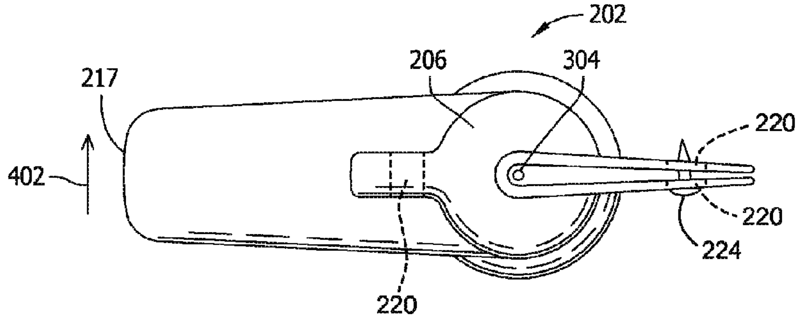

FIG. 4 is a plan view of cutout cover 202 in accordance with an exemplary embodiment of the present invention. In the exemplary embodiment, cutout cover 202 includes wedge-shaped nose portion 216 configured to present an aerodynamic profile and ice shedding feature based on a taper of wedge-shaped nose portion 216 from head portion 206 to distal end 217. Wedge-shaped nose portion 216 is tapered is a horizontal direction 402, which is perpendicular to central axis 304 of insulator 124 (shown in FIG. 1).

Figure 5:
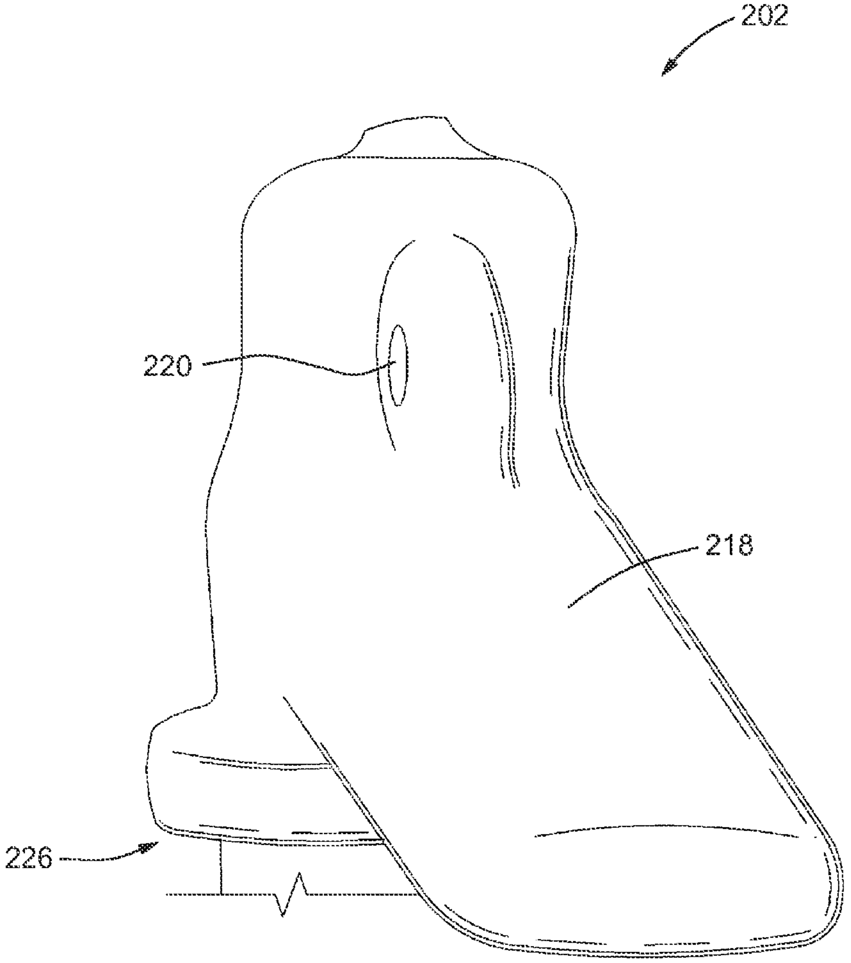

FIG. 5 is a front perspective view of cutout cover 202 in accordance with an exemplary embodiment of the present invention. In the exemplary embodiment, cutout cover 202 presents a smooth protuberance-free surface 218 and an aerodynamic shape that tends to reduce windage effects on cutout cover 202, but also tends to shed ice. Extended throat 226 improves protection for wildlife by covering insulator 124 to a greater degree than known cutout covers.

Figure 6:
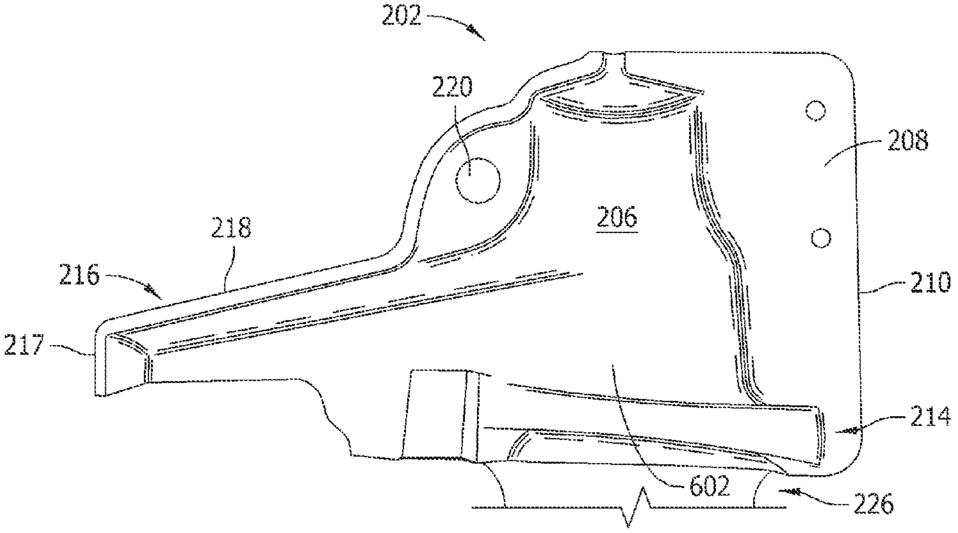

FIG. 6 is a cutaway view of cutout cover 202 in accordance with an exemplary embodiment of the present invention. In the exemplary embodiment, cutout cover 202 includes a hollow interior volume 602 shaped complementary to an upper portion of a predetermined cutout 118 (shown in FIG. 1). An interior shape of volume 602 is varied during a forming process to substantially match the outer periphery of a selected one of a plurality of available cutouts 118.

Figure 7:
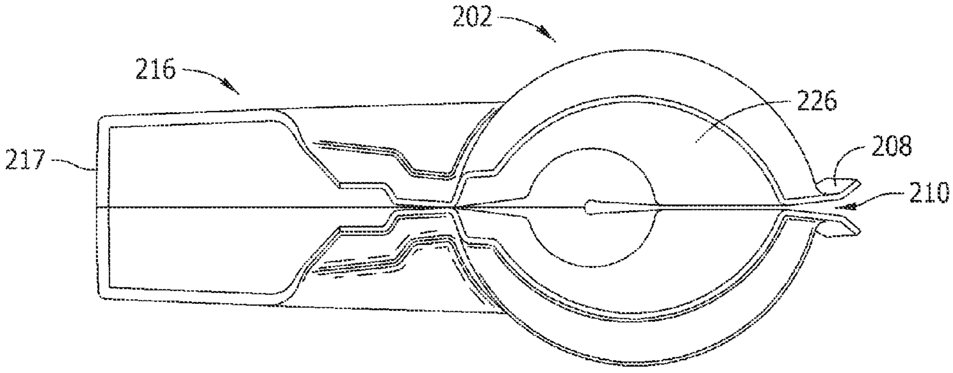

FIG. 7 is a bottom view of cutout cover 202 in accordance with an exemplary embodiment of the present invention. In the exemplary embodiment, throat 226 in head portion 206 is open from the bottom of cutout cover 202 and includes slit 210, which extends through top portion 204 along a contour 212 of head portion 206 such that cutout cover 202 can be spread apart to receive first line connector 142 and first fuse contact 130 through substantially open bottom end 214.

Figure 8:
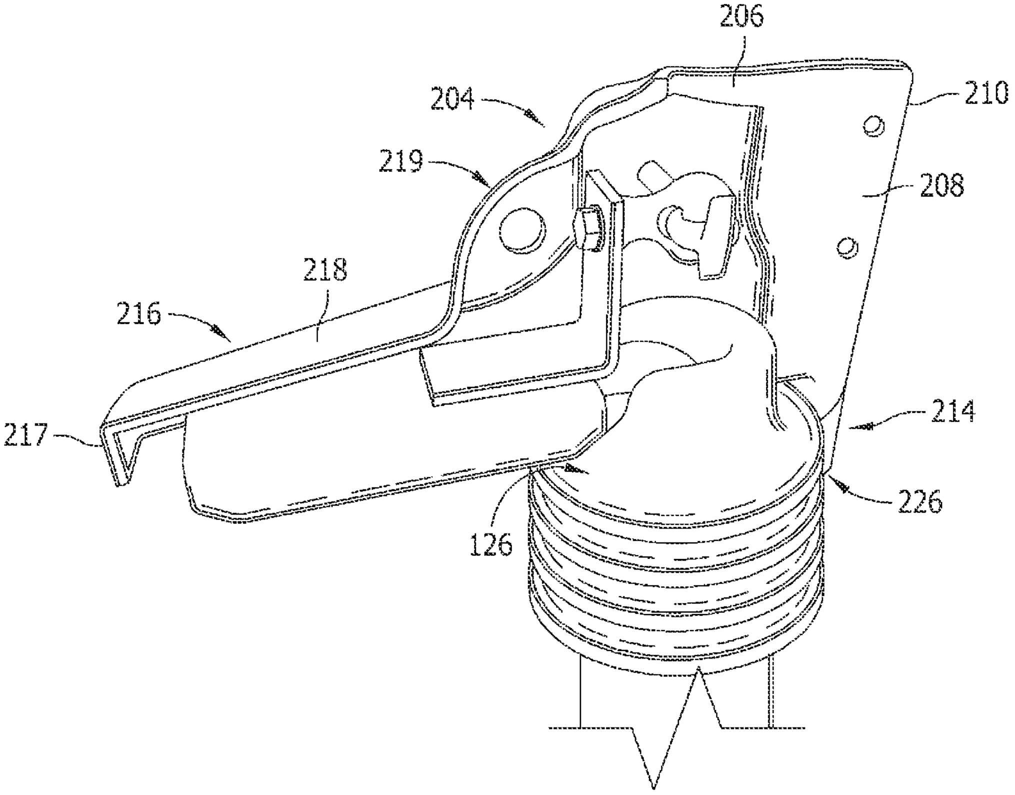

FIG. 8 is a perspective cutaway view of drop fuse cutout 118 having a cutout cover 202 installed in accordance with an exemplary embodiment of the present invention. In the exemplary embodiment, cutout cover 202 is formed of a flexible and resilient material configured to fit snugly around drop fuse cutout 118. Cutout cover 202 includes a hollow top portion 204 with a head portion 206 for covering first end 126. Cutout cover 202 also includes a substantially open bottom end.

Cutout cover 202 includes a wedge-shaped nose portion 216. Nose portion 216 is tapered divergently from a distal end 217 to an end 219 of nose portion 216 proximate a middle of cutout cover 202.

Figure 9:
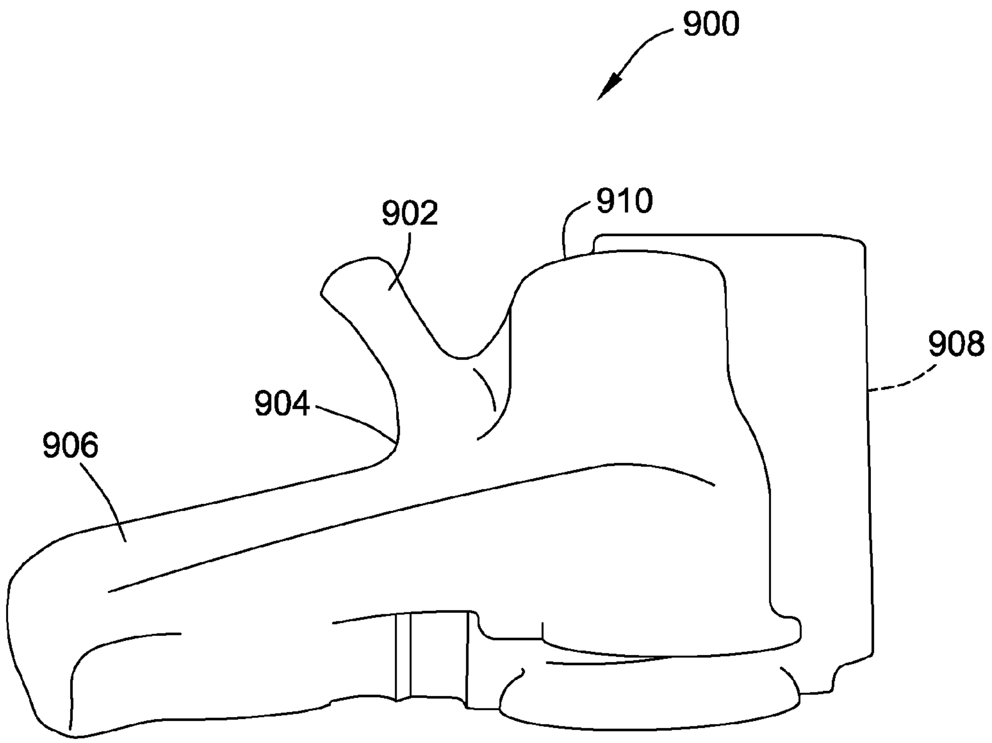
FIG. 9 is a side elevation view of a cutout cover in accordance with another embodiment of the present disclosure.

FIG. 9 is a side elevation view of a cutout cover 900 in accordance with another embodiment of the present disclosure. In the exemplary embodiment, cutout cover 900 includes a grip feature 902 that enhances the installation and securing of cutout cover 900 in place on drop fuse cutout 118

(shown in FIG. 1). Grip feature 902 is configured to receive a tool, such as, but not limited to, a lineman's hotstick or remote operator (not shown). Grip feature 902 may be grasped using the hotstick and cutout cover 900 may be manipulated into position proximate cutout 118. In the exemplary embodiment, grip feature 902 is a cylindrical shape and extends orthogonally away from an end 904 of a nose portion 906 proximate a middle of cutout cover 900. In other embodiments, grip feature 902 is shaped other than cylindrically. Additionally, a slit 908 permits cutout cover 900 to be spread apart using a live hinge portion 910 during installation. Cutout cover 900 is formed of a resilient material that is manipulable with a tendency to spring back to an original shape of cutout cover 900. Once installed on drop fuse cutout 118, cutout cover 900 is fastenable to drop fuse cutout 118.

The above-described embodiments of a method and system of covering an electrical cutout cover provides a cost-effective and reliable means for reducing animal contact with energized electrical equipment. More specifically, the methods and systems described herein facilitate maintaining separation between animals and the energized electrical parts of a utility cutout. In addition, the above-described methods and systems facilitate reducing an accumulation of ice on the cutout and cover it and maintaining an aerodynamic profile to facilitate reducing windage on the cutout during operation. As a result, the methods and systems described herein facilitate operation and maintenance of electrical power systems in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A cover system for a cutout device comprising a cutout cover comprising:

a head portion enclosing a hollow interior space, the head portion including a throat portion that is open from a bottom of the cutout cover;

a tab portion extending from said head portion in a first direction, said tab portion including a slit extending through said tab portion to said head portion and dividing said tab portion into two joinable halves; and a nose portion extending from said head portion in a second direction, the second direction opposite the first direction, said nose portion including a smooth linear surface extending along said nose portion from a distal end of said nose portion to said head portion, said smooth linear surface increasing in distance from a bottom end of said cutout cover from said distal end to said head portion, said smooth linear surface configured to be aerodynamically tapered to reduce wind forces impinging on cutout cover.

2. The system of claim 1, wherein said head portion, said tab portion, and said nose portion are unitarily-formed of a dielectric material.

3. The system of claim 1, wherein said cutout cover is configured to isolate exposed electrical portions of a drop fuse cutout from at least one of wildlife and humans.

4. The system of claim 1, wherein said cutout cover is formed of a flexible and resilient material configured to fit snugly around a drop fuse cutout.

5. The system of claim 1, wherein said cutout cover includes a substantially open bottom end configured to receive a first line connector and a first fuse contact of a drop fuse cutout.

6. The system of claim 1, wherein said nose portion includes a smooth protuberance-free surface extending from the distal end of said nose portion to said head portion, the smooth protuberance-free surface configured to shed ice and reduce a possibility of buildup of ice along the smooth protuberance-free surface.

7. The system of claim 1, wherein said cutout cover comprises at least one of an eyelet and a grip feature extending from the cutout cover, each configured to receive a tool that facilitates installation of the cutout cover on an energized cutout.

8. The system of claim 1, wherein said slit is configured to permit said cutout cover to be spread apart using a live hinge portion.

9. The system of claim 1, wherein said cutout cover comprises a fastener configured to join said two joinable halves of said head portion across said slit such that when fastened said head portion is configured to engage a fuse cutout in an interference fit to secure said cutout cover to a drop fuse cutout.

10. A method of forming a cover for a fuse cutout device, the method comprising:

forming a head portion that encloses a hollow interior space, the head portion including a throat portion that is open from a bottom of the cutout cover;

forming a tab portion extending from said head portion in a first direction, said tab portion including a slit extending through said tab portion to said head portion and dividing said tab portion into two joinable halves; and forming a nose portion extending from said head portion in a second direction, the second direction opposite the first direction, said nose portion including a smooth linear surface extending along said nose portion from a distal end of said nose portion to said head portion, said smooth linear surface increasing in distance from a bottom end of said cutout cover from said distal end to said head portion, said smooth linear surface configured to be aerodynamically tapered to reduce wind forces impinging on cutout cover.

11. The method of claim 10, further comprising forming the head portion, the tab portion, and the nose portion unitarily.

12. The method of claim 10, further comprising forming the head portion, the tab portion, and the nose portion of a dielectric material.

13. The method of claim 10, further comprising forming the head portion, the tab portion, and the nose portion from a flexible and resilient material configured to fit snugly around a fuse cutout device.

14. The method of claim 10, further comprising forming the nose portion that includes a smooth protuberance-free surface.

15. The method of claim 10, further comprising:

spreading opposing portions of the cover along the slit;

positioning the cover proximate an upper end of the fuse cutout device; and drawing the cutout cover down onto the upper end of the the fuse cutout device.

16. The method of claim 15, further comprising securing the cover to the fuse cutout device using a fastener inserted through an eyelet of the tab portion.

17. The method of claim 15, further comprising installing the cover to the fuse cutout device such that exposed electrical portions of the fuse cutout device are at least partially isolated from at least one of wildlife and humans.

18. The method of claim 15, further comprising drawing a substantially open bottom end of the cutout cover over a first line connector of the fuse cutout device and a first fuse contact of a fuse of the fuse cutout device.

19. The method of claim 15, further comprising drawing the cover down such that the nose portion is positioned over the upper end of a fuse of the fuse cutout device.

* * * * *